June 8, 1965 A. G. DEAN 3,187,851
RAILWAY WHEEL AND BRAKE DISC
Filed March 6, 1963

INVENTOR.
ALBERT G. DEAN
BY
Douglas R. McKechnie
ATTORNEY

United States Patent Office 3,187,851
Patented June 8, 1965

3,187,851
RAILWAY WHEEL AND BRAKE DISC
Albert G. Dean, Narberth, Pa., assignor to The Budd Company, Philadelphia, Pa., a corporation of Pennsylvania
Filed Mar. 6, 1963, Ser. No. 263,256
6 Claims. (Cl. 188—218)

This invention relates to a railway wheel and brake disc for use on railway cars in conjunction with suitable disc brake equipment. Among the objects of the invention are the provision of an integral wheel and brake disc which is efficient, strong, axially compact, and relatively silent in operation.

Figure 2:
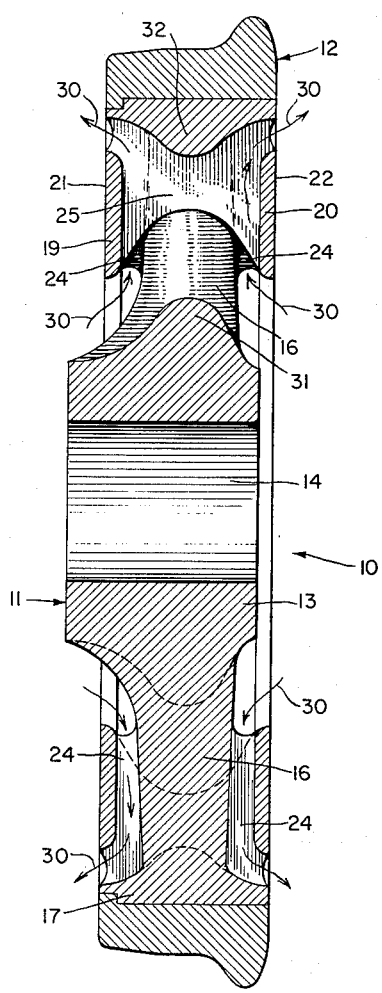
Figure 1:
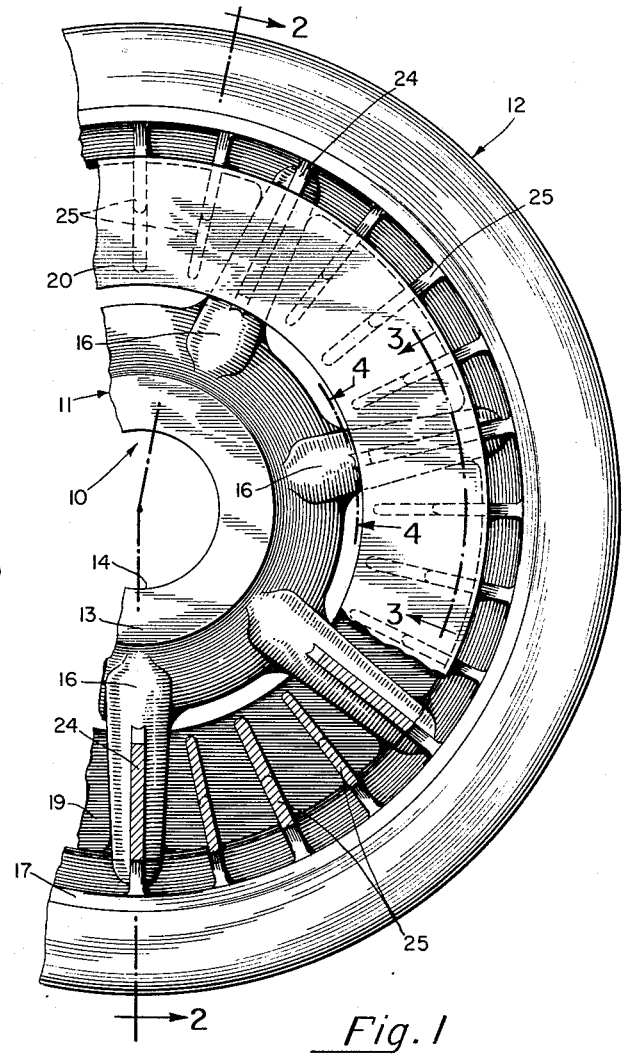
Figure 3:
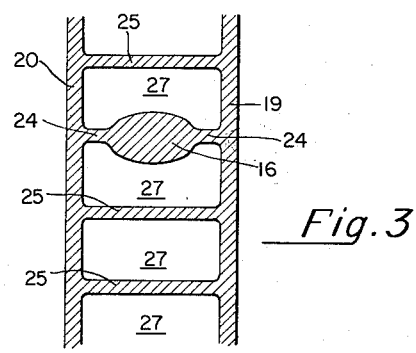
Figure 4:

Other objects and advantages will be apparent from the following description taken in connection with the accompanying drawing wherein:

FIG. 1 is a side elevational view, partly in section and with portions removed, of an illustrative embodiment of the invention; and FIGS. 2, 3 and 4 are sectional views along lines 2—2, 3—3 and 4—4 of FIG. 1 respectively.

Referring now to the drawing, there is illustrated an integral wheel and disc 10 comprising a cast iron central portion 11 and a conventional steel tread 12 attached thereto.

Portion 11 comprises a hub 13 provided with a bore 14 which is adapted to receive a conventional axle upon which two wheels and disc 10 are intended to be mounted to form an integral wheel and axle unit. Extending radially outwardly from hub 11 are a plurality of evenly spaced spokes 16 which, at their outer ends, terminate in an annular, circular rim 17 upon which tread 12 is mounted. The spokes 16 are each of oval-shaped cross section, as shown in FIGS. 3 and 4, and are tapered. Looking at a cross section, the major axis of the oval is parallel to the axis of the wheel and disc.

A pair of annular, circular, back-to-back brake discs 19 and 20 are disposed each on a different side of spokes 16 and present oppositely facing flat faces 21 and 22 (FIG. 2) adapted to be engaged by a pair of suitable brake shoe assemblies for braking the wheel and disc. Faces 21 and 22 are flush with the longitudinal sides of tread 12 and are thus spaced a distance equal to the longitudinal thickness of wheel and disc 10 measured at the tread.

The brake discs are supported by a plurality of cooling fins 24 and 25. Each of fins 24 extends longitudinally between one side of an associated spoke 16 and the adjacent disc. There are two fins 24 associated with each spoke on opposite sides thereof. The outer ends of fins 24 merge into rim 17. On the other hand, each of fins 25 extends directly between discs 19 and 20 and rim 17. The fins 24 and 25 are flat and extend radially outwardly, each fin lying in a plane containing the axis of the wheel and disc.

The fins, in addition to supporting discs 19 and 20, also strengthen rim 17 by virtue of their outer ends merging into rim 17. Furthermore, the fins are radially spaced to provide a plurality of air passages 27 between the fins, through which air flows to cool the fins and the discs. When the wheel and disc rotates, air flows between the hub and the discs, through passages 27, and then between discs 19 and 20 and rim 17, the flow of such air being generally radially outwardly, due to centrifugal force, and in the direction of arrows 30 in FIG. 2.

Hub 11 and rim 17 have rounded central portions 31 and 32 which, in addition to strengthening the hub and the rim, aid in streamlining the flow of coolant air.

A further advantage of the invention is that it should be relatively quiet because of the fact that spoke wheels are known to be quieter than conventional non-spoke wheels. While only a single embodiment has been illustrated, it will be apparent to those skilled in the art that changes can be made in the details of construction and arrangement of parts without departing from the scope of the invention as defined in the appended claims.

What is claimed is:

1. A railway spoke wheel and brake disc comprising: a unitary, one-piece element comprising a hub; a rim concentric to said hub; a plurality of spokes extending between said hub and said rim and supporting said rim on said hub; at least one brake disc concentric to said hub and said rim and spaced radially therefrom; and a plurality of cooling fins extending between and interconnecting said brake disc and said rim for supporting said brake disc and strengthening said rim.

2. A railway spoke wheel and disc in accordance with claim 1 wherein some of said fins also extend between and interconnect said brake disc and said spokes.

3. A railway spoke wheel and brake disc, comprising: a wheel tread; and a unitary portion connected to said tread, said portion being of cast ferrous material and comprising
 a hub,
 a rim concentric to said hub and attached to said tread,
 a plurality of radial spokes connecting said hub and said rim,
 a pair of flat, annular discs disposed on opposite sides of said spokes concentric to said hub and rim and spaced radially therefrom to provide clearance for the flow of coolant air therebetween, and
 a plurality of radial fins between said spokes connected to and supporting said discs, said fins being further connected to and reinforcing said rim at their radial outer ends.

4. A railway spoke wheel and brake disc in accordance with claim 3 wherein said hub and said rim are rounded to define a smooth transition for the flow of coolant air therebetween.

5. A railway spoke wheel and brake disc for a passenger or freight car, comprising a casting comprising: a hub, a circular rim concentric to said hub, a plurality of spokes extending between said hub and said rim and supporting said rim on said hub, said spokes being angularly spaced from each other to provide spaces between adjacent spokes through which coolant air can flow, two circular annular brake discs disposed on opposite sides of said spokes between said hub and said rim in concentric radially spaced relationship thereto to form circular annular air intake openings and air outlet openings between the inner edges of said discs and said hub and between the outer edges of said discs and said rim respectively, said discs being connected to said spokes, and a plurality of radial cooling fins angularly spaced between said spokes, each of said cooling fins extending between and interconnecting said brake discs and said rim.

6. A railway spoke wheel and brake disc in accordance with claim 5 wherein the braking surfaces of said brake discs are coplanar with flat, annular sides of said rim.

References Cited by the Examiner
UNITED STATES PATENTS

| | | | |
|---|---|---|---|
| 2,242,855 | 5/41 | Flowers | 188—218 X |
| 2,352,223 | 6/44 | Trainer | 188—218 X |
| 2,382,550 | 8/45 | Eksergian | 188—218 |

ARTHUR L. LA POINT, Primary Examiner.
EUGENE G. BOTZ, Examiner.